United States Patent
Larsen et al.

(10) Patent No.: US 10,954,358 B2
(45) Date of Patent: *Mar. 23, 2021

(54) **DRIED ATTRACTIVE LURE AND KILL STATIONS FOR THE CONTROL OF *AEDES AEGYPTI***

(71) Applicants: David Larsen, Syracuse, NY (US); Anna Stewart, Syracuse, NY (US); Marco Neira, Pichincha (EC)

(72) Inventors: David Larsen, Syracuse, NY (US); Anna Stewart, Syracuse, NY (US); Marco Neira, Pichincha (EC)

(73) Assignee: Syracuse University, Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,602

(22) Filed: Jul. 23, 2019

(65) Prior Publication Data

US 2019/0345310 A1 Nov. 14, 2019

Related U.S. Application Data

(63) Continuation of application No. 15/990,931, filed on May 29, 2018, now Pat. No. 10,400,084.

(60) Provisional application No. 62/511,461, filed on May 26, 2017.

(51) Int. Cl.
*C08K 3/38* (2006.01)
*C08K 3/015* (2018.01)
*A01M 1/20* (2006.01)
*A01M 1/04* (2006.01)

(52) U.S. Cl.
CPC ............ *C08K 3/38* (2013.01); *A01M 1/04* (2013.01); *A01M 1/2005* (2013.01); *C08K 3/015* (2018.01); *A01M 2200/012* (2013.01)

(58) Field of Classification Search
CPC ........ C08K 3/38; C08K 3/015; A01M 1/2005; A01M 1/04; A01M 2200/012
See application file for complete search history.

(56) References Cited

U.S. PATENT DOCUMENTS

| | | | | |
|---|---|---|---|---|
| 4,988,516 A | * | 1/1991 | Herring | A01N 25/006 424/659 |
| 5,223,270 A | * | 6/1993 | Jones | A01N 25/006 424/659 |
| 6,594,947 B2 | * | 7/2003 | Lingren | A01M 1/14 43/114 |
| 2010/0074860 A1 | * | 3/2010 | Kupfer | A01M 1/2011 424/84 |
| 2014/0044767 A1 | * | 2/2014 | Pennington | A01N 25/006 424/410 |

FOREIGN PATENT DOCUMENTS

WO WO-2008086167 A1 * 7/2008 .......... A01M 1/2011

OTHER PUBLICATIONS

A.E.O. Munsell, et al, Neutral Value Scales. I. Munsell Neutral Value Scale, 23 J. O. S. A. 394 (Year: 1933).*
Joseph A. Francese, et al, Efficacy of Multifunnel Traps for Capturing Emerald Ash Borer (Coleoptera: Buprestidae): Effect of Color, Glue, and Other Trap Coatings, 104 J Econ. Entomol. 901 (Year: 2011).*
Hafiz Azhar Ali Khan, Sarfraz Ali Shad, and Waseem Akram, Combination of Phagostimulant and Visual Lure as an Effective Tool in Designing House Fly Toxic Baits: A Laboratory Evaluation, 8 PLOS ONE e77225 (Year: 2013).*
Sally Cochrane, The Munsell Color System: A Scientific Compromise from the World of Art, 47 Stud. His. Philo. Sci. 26 (Year: 2014).*
E.A. Kemp & T.E. Cottrell, Effect of Lures and Colors on Capture of Lady Beetles (Coleoptera: Coccinellidae) in Tedders Pyrimidal Traps, 44 Environ. Entomol. 1395 (Year: 2015).*

* cited by examiner

*Primary Examiner* — Sean M Basquill
(74) *Attorney, Agent, or Firm* — Bond Schoeneck & King, PLLC; David Nocilly; George McGuire

(57) ABSTRACT

An effective dried attractive toxic bait station that acts as a lure and kill device for *Ae. aegypti* and other mosquitoes. The bait station is a simulated refuge at least part of which is coated with a dried mixture of poison and sugar forming a dried toxic sugar-containing bait. The simulated refuge attracts *Ae. aegypti* and other mosquitoes to bait station and encourages them to land on the coated portion. Once a mosquito has landed, it detects the sugar in the dried mixture of sugar and poison and ingests some of it. Once ingested, the dried mixture of poison and sugar will eventually kill the mosquito.

18 Claims, 11 Drawing Sheets

A

B

C

D

E

DRIED ATTRACTIVE LURE AND KILL STATIONS FOR THE CONTROL OF *AEDES AEGYPTI*

CROSS-REFERENCE TO RELATED APPLICATIONS

The present application is a continuation of U.S. application Ser. No. 15/990,931, filed on May 29, 2018, which claimed priority to U.S. Provisional App. No. 62/511,461 on May 26, 2017.

BACKGROUND OF THE INVENTION

1. Field of the Invention

The present invention relates to mosquito bait stations and, more particularly, to a bait station that simulates a refuge and includes toxic bait.

2. Description of the Related Art

*Aedes aegypti*, the yellow fever mosquito, is a mosquito that can spread dengue fever, chikungunya, Zika fever, Mayaro and yellow fever viruses, and other diseases. The mosquito can be recognized by white markings on its legs and a marking in the form of a lyre on the upper surface of its thorax. This mosquito originated in Africa, but is now found in tropical and subtropical regions throughout the world, and is considered to be among the most widespread mosquito species.

Although *Aedes aegypti* mosquitoes most commonly feed at dusk and dawn, indoors, in shady areas, or when the weather is cloudy, they can bite and spread infection all year long and at any time of day. Only the female bites for blood, which she needs to mature her eggs. To find a host, these mosquitoes are attracted to chemical compounds emitted by mammals, including ammonia, carbon dioxide, lactic acid, and octenol.

Mosquitos of the *Aedes* genus are container breeders, i.e. they utilize anything that collects water as a larval habitat including old tires, fountains or buckets left outside and primarily feeding inside the home in the daytime or early evening. Previous to their adaptation to urban environments, *Ae. aegypti* utilized tree holes for breeding sites. The mosquitoes prefer to breed in areas of stagnant water, such as flower vases, uncovered barrels, buckets, and discarded tires, but the most dangerous areas are wet shower floors and toilet tanks, as they allow the mosquitos to breed in the residence. Research has shown that certain chemicals emanating from bacteria in water containers stimulate the female mosquitoes to lay their eggs. They are particularly motivated to lay eggs in water containers that have the correct amounts of specific fatty acids associated with bacteria involved in the degradation of leaves and other organic matter in water. The chemicals associated with the microbial stew are far more stimulating to discerning female mosquitoes than plain or filtered water in which the bacteria once lived.

Mosquito control is currently the best method for disease prevention. This primarily includes source reduction, pesticide spraying or "fogging", or the use of mosquito traps like the lethal ovitrap (a device which attracts gravid female container-breeding mosquitoes and kills them; the traps halt the insect's life cycle by killing adult insects and stopping reproduction). Although the lifespan of an adult *Ae. aegypti* is two to four weeks depending on conditions, the eggs can be viable for over a year in a dry state, which allows the mosquito to re-emerge after a cold winter or dry spell.

Attractive toxic sugar baits have been widely tested for control of various mosquitoes. Attractive toxic sugar baits sprayed on vegetation have been demonstrated to reduce *Anopheles* mosquito populations in Israel and Mali, however researchers there sprayed the solution on vegetation. Spraying attractive toxic sugar baits on vegetation is problematic for 2 reasons: the method may have severe negative effects on the environment and other pollinators, and applying the method requires a strong and expensive infrastructure of trained personnel, supplies and logistics. No studies have been published on the effect of toxic sugar baits against *Ae. aegypti* mosquitoes, and there has been much skepticism about the utility of sugar baits to control them. Compared to other mosquito species, *Ae. aegypti* appear to have a lower propensity for sugar-feeding, preferring human blood meals. Moreover, traditional attractive sugar bait strategies that rely only on sugar as an attractant are likely insufficient to "lure" female *Ae. aegypti* in the natural environment.

A number of mosquito traps have previously been designed. The most common of these prior art traps is the BG-Sentinel trap, which targets ovipositing female *Aedes aegypti*. This trap consists of a white garbage-can type cylinder and a black funnel opening (FIG. 1A). The black funnel opening against the white cylinder provides a visual cue to approaching mosquitoes, emphasizing the contrast between the physical cavity (the funnel) and its surroundings (the white container). The BG-Sentinel trap has a fan that pulls the mosquito into the trap once it approaches closely enough. It also uses chemical cues to attract *Ae. aegypti*. Mosquitoes are captured and retained.

The Biogents Mosquitaire trap (FIG. 1B) is another prior art example of a mosquito trap. Like the BG-Sentinal trap, it employs a fan which sucks attracted mosquitoes into a catch bag below the black suction column of the trap. It attracts mosquitoes using an air stream mimics the typical scent plume that is produced by a warm human body by incorporating small amounts of substances like those also emanated by the human skin and carbon dioxides. The trap has a black tube in the center of a white top to complete the trap's mimicry of humans, which the Biogents web site describes by saying: "The contrast between the dark center and the light surface of the trap is an additional important attractive signal for the mosquitoes, and completes the capture method; . . . To the mosquitoes the trap looks just like a human being."

The MosquiTRAP (FIG. 1C) is a dark-colored container with at least one opening leading to a chamber which has a sticky internal surface to entrap the mosquitoes. It is described in Patent no. WO 2004/34783. Mosquitoes are lured in and trapped.

Patent no. WO2014167553 describes to a prior art trap designed for attracting and capturing the *Aedes aegypti* mosquito. It uses visual and chemical stimuli as an attraction mechanism, the visual stimuli being provided by two contrasting colours: red in the body of the trap and black in the entrance to the trap. The trap has an opening leading via a non-linear path to a chamber, a design that makes it difficult for the mosquitoes who have entered the trap to exit it. Bait disposed within the container emits moisture and volatile compounds to attract mosquitoes into the trap, from which it is difficult for them to escape.

Other traps target oviposition behavior including the ovillanta, which is constructed from old tires (FIG. 1D). Users hang the ovillanta and add water to an interior basin formed by one of the tire pieces. Female mosquitoes will deposit eggs into the water, and then fly off. The user must periodically destroy any eggs that are deposited into the water or larvae that emerge therefrom before they mature into adults and fly off.

A 'fake flower' mosquito control device created by at the Georgia Southern University at Statesboro attempts to mimic a flower (FIG. 1E). It has a round center region surrounded by dark petals, with the center region's four quadrants separated by white, each quadrant a different color. In the center of the device is a circular screen. In descriptions, it is stated that different colors are used to attract different mosquito species. The screen at the center of the fake flower is specially engineered to have tiny holes that are only large enough for the mosquito's tube-shaped mouth (the proboscis) to get through, thereby ensuring that ants, butterflies and other insects aren't accidentally snared in the trap. There is a chamber for holding chemical treatments behind the screen. At one point being developed commercially under the name Provector, the device is designed to use visual, olfactory and chemical signals to entice mosquitoes to ingest antimalarial and antiviral treatments that inhibit the development of the pathogens. It is not designed to kill the mosquitoes, but rather the pathogens they carry, such as the Plasmodium parasites that cause malaria. The device has several different components that must be assembled. The cost to manufacture the device was estimated at between five and ten dollars each.

Very cheap, convenient and readily deployable options for control of *Aedes aegypti* are thus not currently available, particularly devices for inconspicuously killing *Ae. aegypti* inside of residences. In an effort to develop one, work began to design a novel device to control the *Aedes aegypti* mosquito. The work was inspired by the efforts of various scientists on attractive toxic sugar baits (ATSB) to control malaria vectors. Preliminary ideas revolved around the use of wet ATSB deployable in bait stations, with the end goal of a device that could be purchased from markets or delivered in public health campaigns. Sprayed ATSB is not interesting because of the huge implementation cost and the technique's inapplicability to interior environments. Moreover, indiscriminate spraying often has a detrimental effect on other, often beneficial, insects within the sprayed area.

BRIEF SUMMARY OF THE INVENTION

The present invention is based on a discovery made in a laboratory in Quito, Ecuador when testing prototype wet ATSB devices that ultimately proved ineffective against reared female *Ae. Aegypti*. In one of the cages, the wet ATSB device leaked and covered the floor of the cage. After wiping the cage dry, *Ae. aegypti* were released into it; within 24 hours all *Ae. aegypti* released into that particular cage were dead. Subsequent investigation determined that there was a thin layer of a dried attractive toxic sugar solution on the floor of the cage. With this discovery, a useful wet ATSB device was abandoned and work instead focused on creating an effective dried attractive toxic bait stations (DATBS). This work was transformed into the DATBS of the present invention.

The present invention includes a lure and kill device, comprising a planar substrate having a dark region along with a dry coating applied to at least a portion of the dark region, wherein the coating comprises a toxic compound mixed with bait. The toxic compound may comprise boric acid. The bait may comprise sucrose. The planar substrate may have a light region adjacent the dark region. The light region may be a circle and the dark region may be a ring surrounding the circle. The dark region may be a circle and the light region may be a ring surrounding the circle. The dark region may comprise a rectangle with a light region that comprises a rectangle adjacent the rectangle of the dark region. A second planar substrate may be positioned above and spaced apart from the first planar substrate. The second planar substrate may include a second coating. The dark region may have an area of at least 0.5 square centimeters. The present invention also includes a method of luring and killing mosquitos, comprising the step of providing a lure and kill device including a planar substrate having a dark region and a dry coating applied to at least a portion of the dark region, wherein the coating comprises a toxic compound mixed with a bait. The lure and kill device may comprise various options as described above.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figures 7A, 7B:
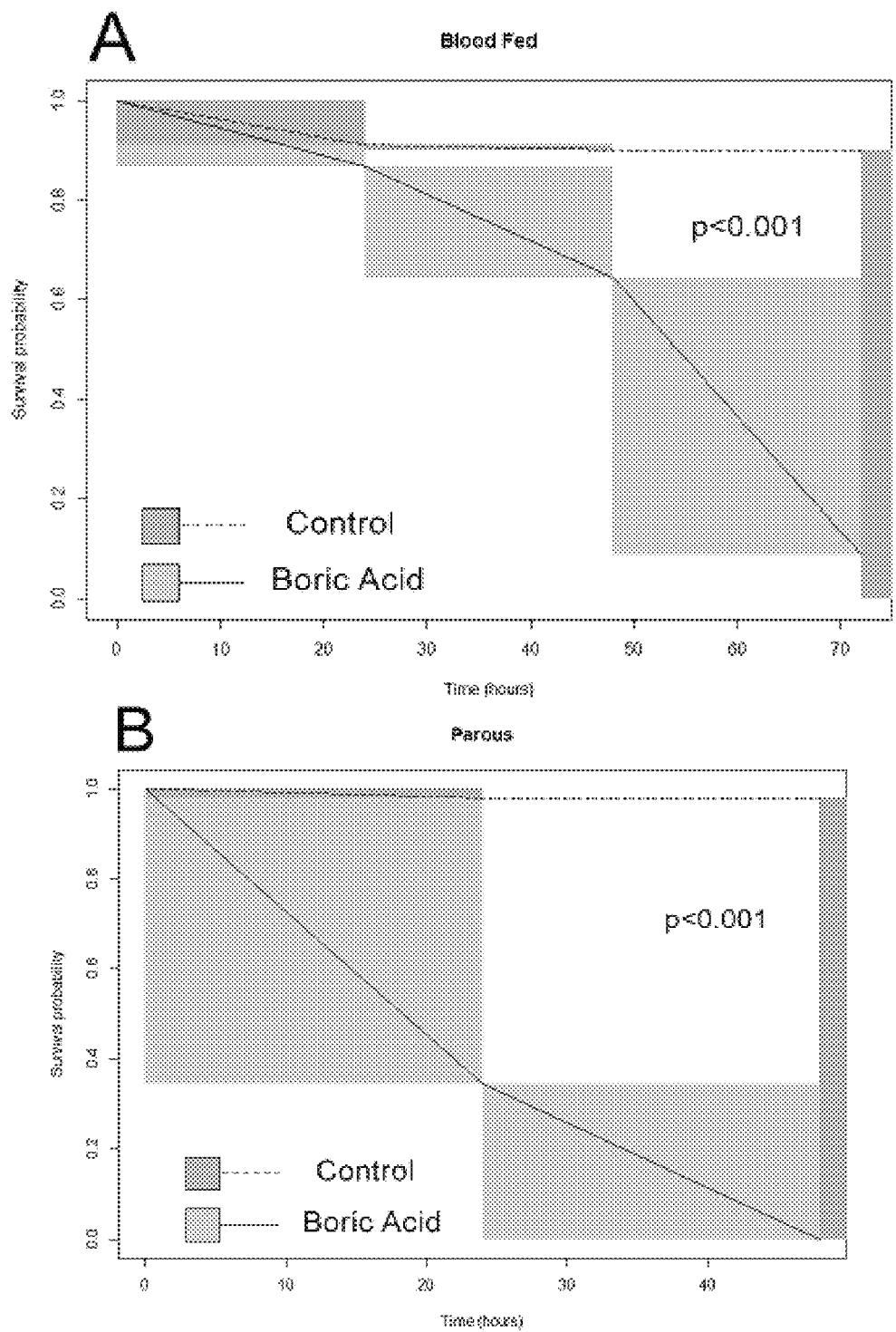

FIGS. 6A-6F are images of the histopathological effects on the midgut, with longitudinal sections of *Aedes aegypti* posterior midgut (A, C, E, F); mosquitoes exposed to toxic devices (B, D); and normal posterior midgut of mosquitoes exposed to non-toxic devices. Abbreviations: LM, gut lumen; AC, adipocyte; ED, epithelial disruption;

FIGS. 7A and 7B are graphs of the effects of the physiological status of the mosquitoes on the performance of the device. Survival of individuals exposed to toxic (dotted line; n=90) or non-toxic devices (solid line; n=90). Survival curves and NPMLE for (A) blood fed individuals exposed for 72 hours and (B) parous mosquitoes exposed to the device 48 hours.

Figure 8A:
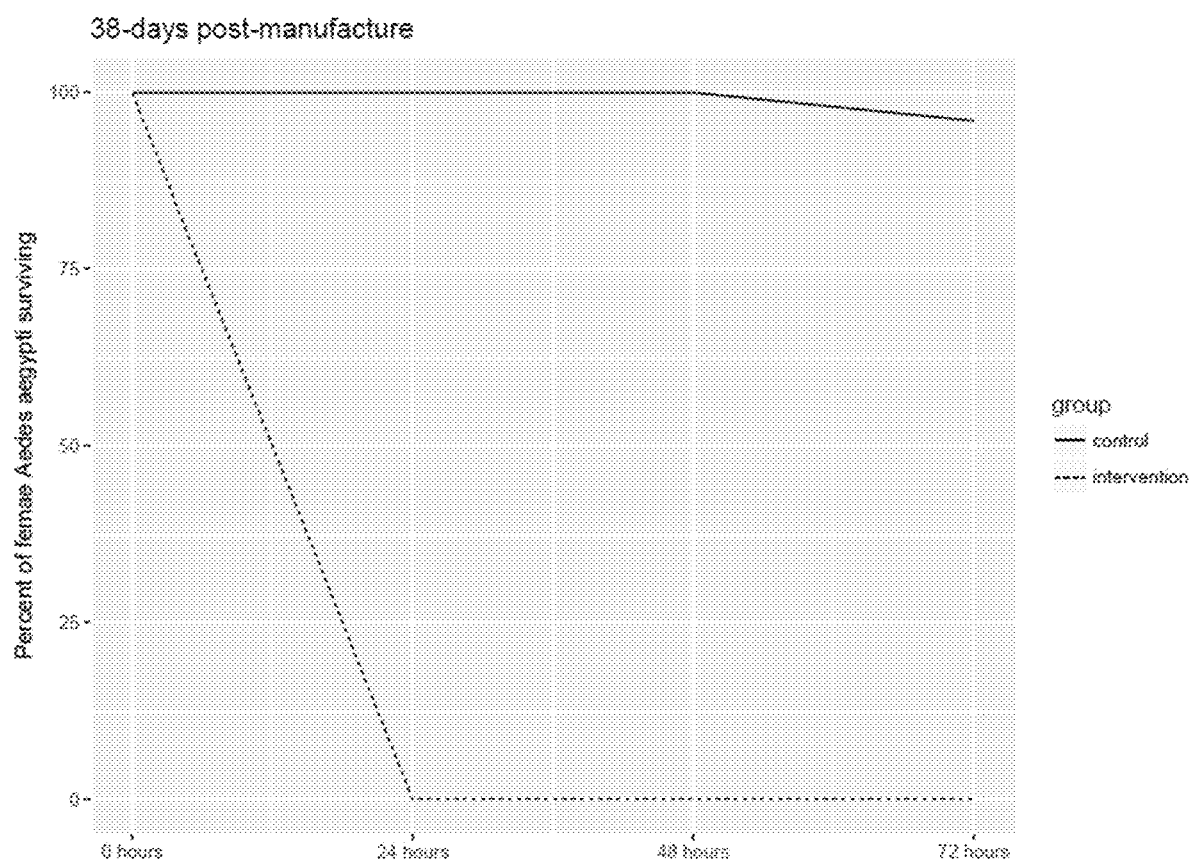
Figure 8B:
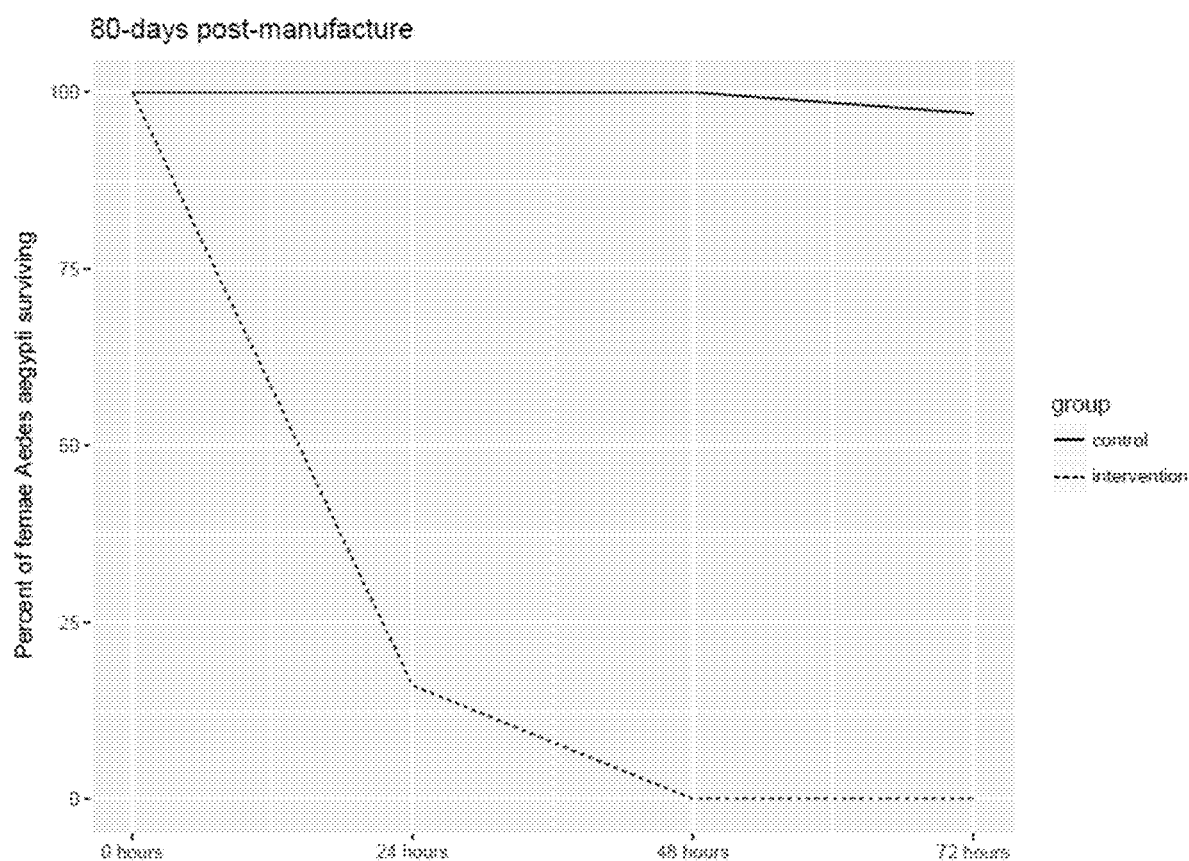
Figure 8C:
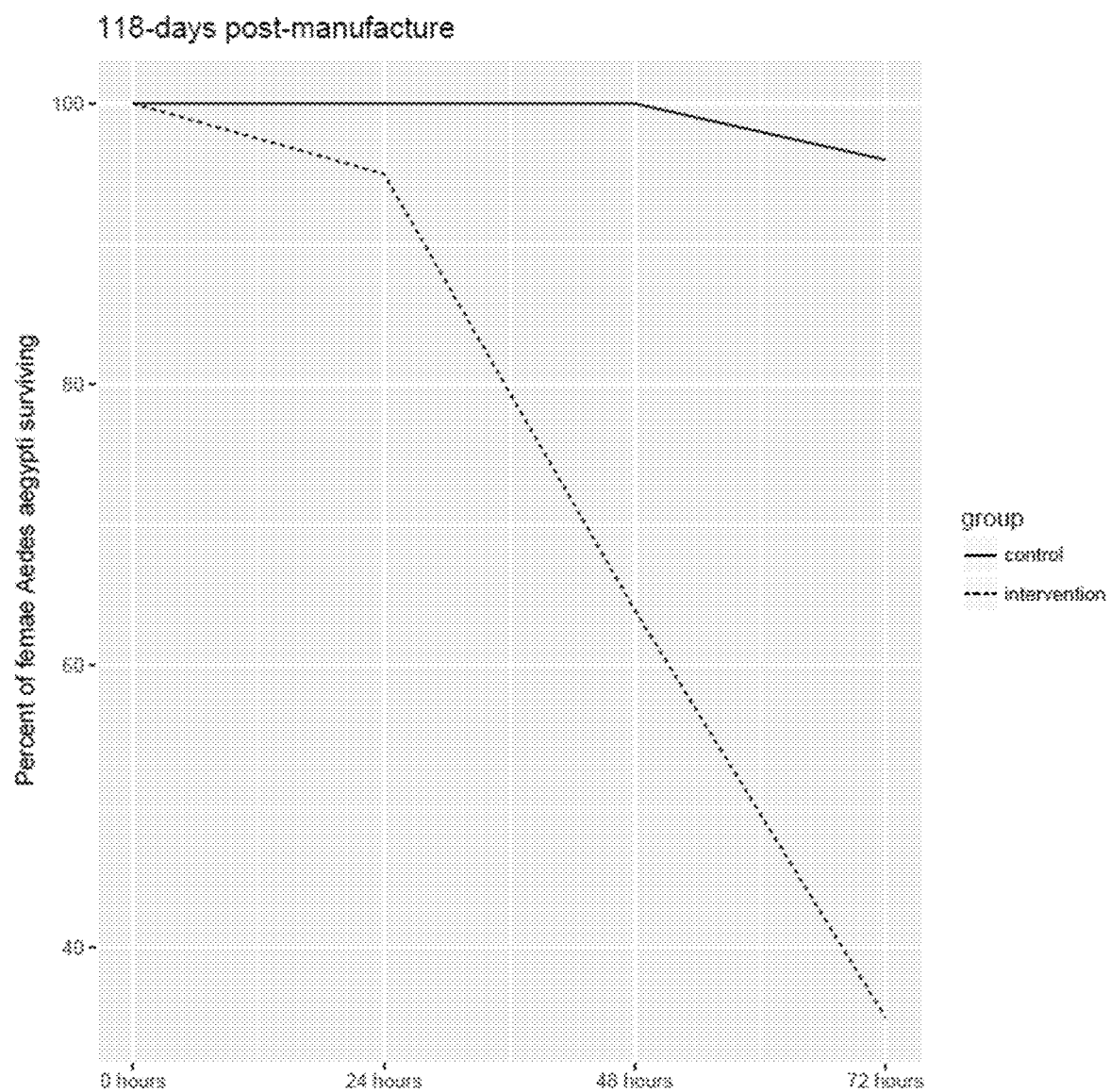

FIGS. 8A-8C are graphs of shelf life of the device showing survival and NPMLE of individuals exposed to toxic (dotted line; n=90) or non-toxic devices (solid line; n=90) that had been stored for: FIG. 8A—38 days, FIG. 8B—80 days, and FIG. 8C—118 days. Interval-censored survival data collected in two time points (24 h and 48 h).

DETAILED DESCRIPTION OF THE INVENTION

Referring to the figures, wherein like numerals refer to like parts throughout, the DATBS of the present invention is a lure and kill device, also referred to herein as a trap or a lure and kill trap. The present invention consists of a simulated refuge (e.g., a simulated cavity or hole) at least part of which is covered with a dried mixture of poison and sugar (a dried toxic sugar-containing bait or DTSB). The purpose of the simulated refuge is to attract the *Ae. aegypti* and other mosquitoes to the DATBS and encourage them to land on a DTSB-coated portion thereof. Once a mosquito has landed, it will detect the sugar in the dried mixture of sugar and poison, and ingest some of it. Once ingested, the DTSB will eventually kill the mosquito. The bait that is mixed with the poison to create the DTSB comprises any substance that will trigger an ingestion response in the mosquito targeted by the DATBS, such as an ovipositing female *Aedes aegypti* mosquito, when it lands upon the dried substance (i.e., the mosquito will eat opportunistically if it detects the substance beneath its feet). Baits may comprise a monosaccharide (e.g., glucose (dextrose), fructose and galactose), a disaccharide (e.g., sucrose (sugar), maltose and lactose), a polysaccharide (e.g., glycerol, sugar alcohols), or a diet food substitute for sugar (e.g., an artificial sweetener such as aspartame or sucralose). Sweetened substances such as plant nectar and honey may be used. The poison (toxic compound) in the DTSB is any substance that once ingested by the mosquito targeted by the DATBS, such as an ovipositing female *Aedes aegypti* mosquito, will cause the mosquito to be permanently debilitated, to die, or to otherwise render the targeted mosquito incapable of harming humans or animals, such as by transmitting a disease, parasite, virus or bacteria.

Referring to FIGS. 2A-E, a DATBS 10 generally consists of a planar two-dimensional substrate 14 with two sides, the first (front) side 12 of which will be exposed when the device is properly used, and the second (back) side 13 of which will generally not be exposed, but will rather be adjacent to a separate planar surface (e.g., a wall) on which the DATBS has been placed or to which it has been attached. Note, however, that if the DATBS is intended to be suspend from, say, the ceiling, or on a stick, such as in the embodiment shown in FIG. 2B, it may have dark and poison-coated regions on both sides. At least a portion 18 of the first, exposed side 12 is dark (e.g., brown, black) and at least a portion of the dark region 18 is be coated with the DTSB 16 (e.g., dried sucrose-boric acid solution).

*Ae. aegypti* rest in dark places or on dark clothing, which allows them to hide more easily than resting on a light surface. This resting behavior is particularly observed after the mosquitoes have taken a blood meal wherein the mosquito may rest for 24-48 hours. The dark region 18 on an exposed side 12 of the DATBS 10 attracts mosquitoes looking for a place to hide (i.e., a refuge). When contrasted with a light region 19 on the front side 12 or with light surroundings (e.g., a light-colored wall to which the DATBS is attached), the illusion of the dark region 18 as a refuge is enhanced, perhaps by making the dark region 18 appear to a mosquito more like a cavity in a tree or a place to deposit eggs. This increases the likelihood that a mosquito seeking a hiding place or refuge will land on the 'false refuge' simulated by the DTSB-coated dark region 18 of the DATBS 10.

The terms 'dark' and 'light' can be given more specificity by defining them using the Munsell color system's neutral values lightness scale (https://en.wikipedia.org/wiki/Munsell_color_system). In addition to defining absolute levels of lightness/darkness, it is important to note that the level of contrast between a dark region of the DATBS and any surrounding light area (for example, an encircling light region on the DATBS or a light-colored wall on which the DATBS is placed) may affect how dark on the neutral value scale of the Munsell color system the dark region must be to simulate a refuge to mosquitoes. For example, a medium gray region may be dark enough to act as a false refuge and attract mosquitoes seeking refuge to land on it when it is surrounded by a white region but not when it is surrounded by a tan-colored region only slightly lighter than it. As a result, one DATBS may have a light region that is as dark or darker than the dark region of another DATBS.

For the purposes of the present invention, a region may be considered dark if it has a neutral value (lightness) in the Munsell color system of 7, 6, 5, 4, 3, 2, 1 or 0, inclusive of any neutral value in between. A region may be considered light if it has a neutral value in the Munsell color system of 10, 9, 8, 7 or 6, or any neutral value in between. In an embodiment having both a dark region and a light region, the difference between the dark region's neutral value and an adjacent light region's neutral value is at least 3, 4, 5, 6 or 7 steps on the Munsell color system neutral value scale. For example, a region having a Munsell neutral value of 3 is considered dark when adjacent to a region having a Munsell neutral value of at least 6. In the present invention, a region of the DATBS is considered sufficiently dark if it appears to the mosquito being targeted as a place to hide or seek refuge, therefore inducing the mosquitoes to preferentially land on that region. In an embodiment, the dark region has a Munsell color system neutral value of 2 or less. In an embodiment, the dark region has a Munsell color system neutral value of 3 or less. In an embodiment, the light region has a Munsell color system neutral value of 8 or more. In an embodiment, the difference between the dark region's neutral value and an adjacent light region's neutral value is at least four steps on the Munsell color system neutral value scale. In an embodiment, the difference between the dark region's neutral value and an adjacent light region's neutral value is at least five steps on the Munsell color system neutral value scale (e.g., the dark region's value is 8 and the light region's value is 3). In an embodiment, the difference between the dark region's neutral value and an adjacent light region's neutral value is at least six steps on the Munsell color system neutral value scale.

The dark region and any light region of a DATBS can have any Munsell color system Chroma value (or level) between 0 and 12 inclusive. The dark region and any light region of a DATBS can have any Munsell color system Hue value. In an embodiment, the Munsell color system Chroma level of the dark region and/or of any light region is 4, 3, 2, 1 or 0, or any Chroma level in between. In an embodiment, the Munsell color chroma level of the dark region and/or any light region is 0 (both the light and dark regions are grayscale). In an embodiment, the Munsell color chroma level of the dark region and/or of any light region is 1 or less. In an embodiment, the Munsell color chroma level of the dark region and/or of any light region is 2 or less. Neither the dark region, nor any light region, need be monochrome. Either can be polychrome (multiple neutral values, chroma and hues on the Munsell color system). For example, the dark region might be colored using multiple shades or hues of green in an attempt to simulate a foliage-base refuge (e.g., a camouflage pattern), or the light region might include multiple shades of white, yellow and light brown. The brightness of a region can affect its perceived darkness or lightness. In an embodiment, the dark region has a low brightness (i.e., perception of reflecting or radiating light), especially to the mosquito targeted. In an embodiment, the light region has a moderate to high brightness.

As mentioned previously, there has been much skepticism about the utility of sugar baits to control *Ae. aegypti*, since compared to other mosquito species, *Ae. aegypti* do not appear to actively seek out opportunities to feed on sugar-containing foods, preferring instead to seek human blood meals. It is for this reason that a fake flower such as that shown in FIG. 1E, which may attract certain types of mosquitoes to its bait, will not work to attract *Ae. aegypti* to a poison bait, and is therefore not useful as an *Ae. aegypti* lure and kill device. It turns out, however, that despite their apparent lack of interest in sugar-feeding, female *Ae. aegypti* are facultative sugar feeders, and will feed on sugar in a laboratory environment and occasionally feeding on plant sugars in the wild. Thus, while *Ae. aegypti* may not actively seek out sugar for feeding, they are not adverse to consuming readily available sugar. By incorporating a sugar meal (i.e., the dried sugar-poison mixture) on the surface of its simulated refuge, the DATBS makes sugar readily available. Once the mosquito lands on the DATBS's 10 simulated refuge (i.e., a darkened region 18), the dried sugar-poison mixture (i.e., DTSB) elicits an ingestion response in the mosquito (i.e., the mosquito consumes some of the mixture) and the mosquito is poisoned.

Figures 2A, 2B, 2C:
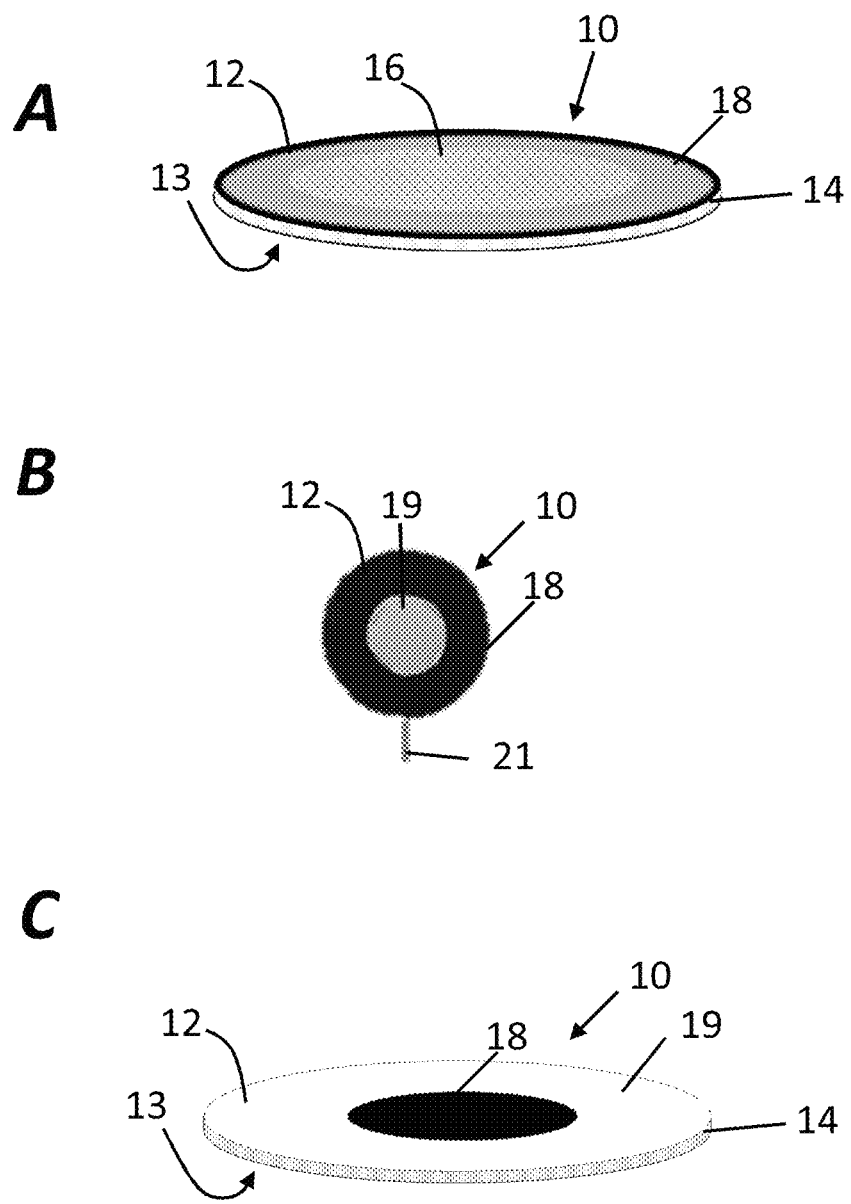
FIGS. 2A-2E are schematics of various embodiments of the lure and kill stations according to the present invention.

In an embodiment shown in FIG. 2A, the DATBS 10 is a round, planar, substrate 14 (e.g., a thick piece of paper, vinyl sheet) that is completely dark 18 on the first, exposed side 12 with a layer of dried sugar-poison mixture 16 coating most of the exposed side 12. In practice the DTSB may be transparent and therefore invisible, and preferably covers the entire dark area. It is shown covering only part of the dark region 18 in FIG. 2A for illustrative purposes only. In use, this embodiment of the DATBS 10 is preferably placed on a light-colored (e.g., white) surface (e.g., wall) in order to enhance the illusion that the dark, exposed side 12 of the DATBS is a refuge.

Figure 2E:
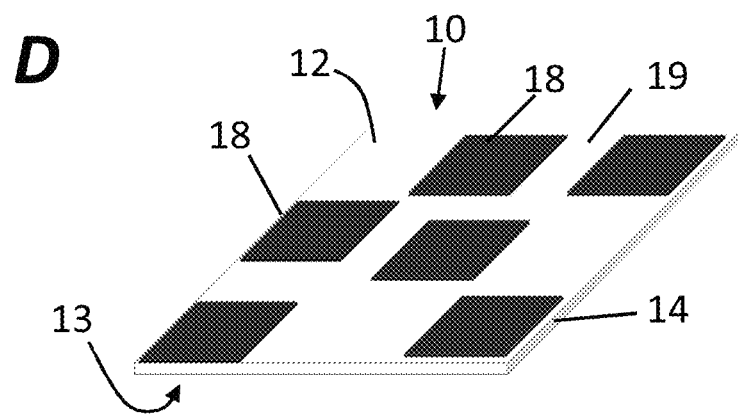
Figure 2D:
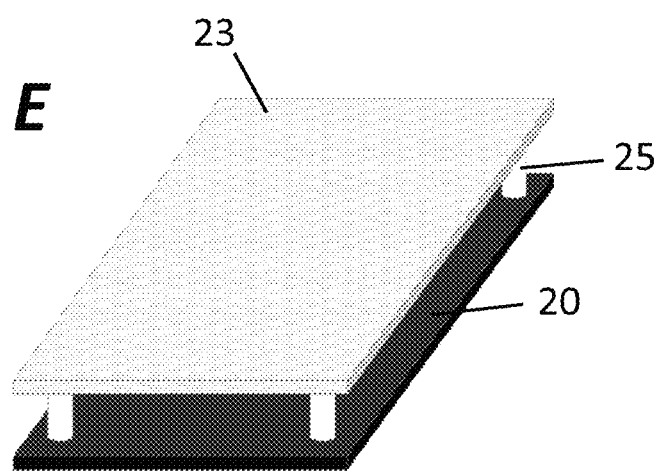

In embodiments as shown in FIGS. 2B-D, the refuge illusion is enhanced by having both light regions 19 and dark regions 18 on the exposed side 12 of the substrate 14 of the DATBS 10. The embodiment in FIG. 2B has a circular substrate 14 with the dark portion 18 forming a concentric ring surrounding a circular light region 19. The photo in FIG. 2B shows a prototype DATBS 10 which consisted of two concentric foam sheet circles: an inner white circle 19 (5 cm diameter) and an outer black circle 18 (10 cm diameter). Before assembly, both foam circles 18 and 19 were individually submerged for 24 hours in a toxic sugar solution (1% boric acid, prepared using 10% sucrose solution as solvent). After 24 hour submersion, the foam circles were air-dried for 24 hours and subsequently stapled together with the white foam circle 19 situated at the center of the black foam circle 19. A bamboo stick 21 was fixed to the back of the device 13, to serve as a stand.

The embodiment in FIG. 2C has a circular substrate 14 with the light portion 19 forming a concentric ring surrounding a dark circular region 18. The embodiment shown in FIG. 2D has multiple rectangular dark regions 18 within a light background region 19. DTSB preferably coats at least the dark regions 18 of each DATBS 10, although the entire exposed surface 12 (i.e., both light 19 and dark 18 regions) can be coated.

In an embodiment, as shown in FIG. 2E, the trap has a first layer 20 which is a dark flat trap such as the trap 10 shown in FIG. 2A (except square instead of round in the particular embodiment shown in FIG. 2E) with a parallel flat light-colored second layer or 'roof' 23 suspended an appropriate height above it (e.g., 1.5 cm) on posts or blocks 25, somewhat similar to an open-air ant trap. DATBS of this embodiment are less obtrusive than a black trap when placed on a wall, especially if the 'roof' 23 is painted the same color as the wall. This embodiment can also be installed under other items, such as smoke detectors. The roof 23 can also be coated with poison, and its bottom surface can also be a DATBS.

Further embodiments of the DATBS are clearly possible. For example, the shape and size of the DATBS be varied for any reason, including for ease of deployment and for aesthetic purposes. A DATBS and any dark region or light region of the DATBS can be of any shape, including, but not limited to, rectilinear, ovoid, ellipsoid, cruciform, star-shaped (e.g., 5 or 6 pointed stars), polygonal, or irregular. The dimensions of the DATBS can range from small (e.g. 0.5 cm or less) to large (1 meter or more) and any dimension in between. If the DATBS has both light and dark regions, these regions can be of any number, size and shape. Since shape and size is so flexible, DATBS can be made part of or incorporated into common household objects, such as picture frames, magnets, or calendars, that are typically attached to or hung on the wall of the residence or office.

A rectangular embodiment of the DATBS shown in FIG. 2A can be rolled to form a tube and sealed along the seam, with the light colored reverse side 13 facing the outside, and the dark, poison-covered side 12 facing the interior. This embodiment can be placed in a corner or between a wall and ceiling. One or more rectangular DATBS can be attached to one another and/or to other plain pieces of the same or a different substrate to form a box with one or two open ends, with the reverse side 13 of the trap 10 facing externally and the a dark sides coated with the dried poison-sugar side 12 facing inwards. These embodiments can be attached to the back of furniture between it and the wall, with the opening facing out towards the room. Because the substrate of the trap of the present invention can be paper or cardboard, it can be folded origami-style into a multitude of forms, or cut, glued and folded into any of the many forms used in packaging.

Almost any household object can be transformed into a DATBS by adding a darkened region, preferably surrounded by a lighter colored region, and coating the darkened region with DTSB.

The color of the dark region 18 of a DATBS 10 can be varied, so long as the colors are relatively dark (e.g., dark green, navy, brown, black, etc.). If the device incorporates a lighter-colored region 19 to provide contrast to the dark region, the light-colored area 19 can also be of various colors which will provide a degree of contrast to the dark region 18 (e.g., white, beige, light grey, light blue, pink, etc.). The dark regions 18 should cover an area of the DATBS 10 sufficient to create the illusion of a refuge for a mosquito, such as at least 0.5 cm squared, 1 cm squared, 2 cm squared, 3 cm squared, 4 cm squared, 6 cm squared, 10 cm squared, or larger. The dark regions 18 can be any shape that creates the illusion of a refuge for a mosquito, such as rectilinear, ovoid, ellipsoid, cruciform, star-shaped (e.g., 5 or 6 pointed stars), polygonal, or irregular. The light area(s) 19 of the DATBS 10 can be of any shape or size. In an embodiment, one or more dark-colored areas 18 are surrounded by a contiguous light-colored area 19. In an embodiment, one or more light-colored areas 19 of a DATBS 10 are surrounded by a contiguous dark-colored area 18.

As stated above, a wide range of materials can be used to make the trap of the present invention. Almost any surface that does not completely absorb the poison can be used as the substrate. Materials that can be used for the substrate include, but are not limited to, wood, metal, plastic, paper, cardboard, magnetic-backed polymeric material such as is used for signs attached to car doors, sheet polymer, foam, single-sided adhesive tape, fabric of any type, adhesive-backed sticker, Colorform® vinyl, and sticky notes like Post-It®. Referring to FIGS. 2A-2D, in an embodiment, the substrate 14 is a sheet of vinyl-coated flexible magnetic material, where the magnetic side is the back side 13 and the front side 12 has a dark region 18 coated with dried sugar-poison mixture 16 (not shown in all) and, in the embodiments shown in FIGS. 2B-2D, a light region 19 which is optionally also coated with dried sugar-poison mixture. This embodiment can be attached to steel surface, such as for example, the back of a security door, the door of a light-colored refrigerator or the side of a light-colored microwave. In another embodiment, the substrate 14 is an adhesive backed substrate (e.g., paper, plastic), where the front side 12 is the side without the adhesive.

In the initial prototype, boric acid, a cheap and commonly used pesticide, was used as the insecticide that was mixed with sugar in solution and then dried. Boric acid can be replaced by any poison that will kill mosquitoes after ingestion, preferably ones whose taste or odor does not repel mosquitoes. Options include any one of the numerous gut poisons developed for agricultural use.

In the initial prototype, sucrose dissolved in water was used to make the DTSB. Other sugars or sweeteners can be substituted for sucrose including, but not limited to, fruit juice, fructose dissolved in water, any type of syrup, nectar, honey, etc.

Advantages Over Prior Art Traps

The DATBS differs from prior art traps in a number of important ways. Nearly all prior art traps are three-dimensional false oviposition sites which create actual cavities mosquitoes can enter (i.e., an actual refuge, albeit one intended to provide the opposite of refuge). The one exception is the fake flower trap shown in FIG. 1E, which tries to attract mosquitoes by mimicking a flower's appearance. Many prior art traps also employ chemical attractants to attract mosquitoes, such as plant nectars and carbon dioxide. Many also use sugar as bait, often fructose or special fructose mixtures containing plant nectars or scents. A DATBS uses neither an actual cavity nor any chemical attractant to attract mosquitoes. Rather, the dark area 18 on a DATBS 10 merely creates the illusion of a cavity or dark refuge. This simulated refuge serves as the mosquito attractant. Although the DTSB contains sugar, it should be emphasized that the sugar in the DTSB serves a very different function than served by the sugar in standard attractive toxic sugar baits. Rather than being used as a mosquito attractant (as already pointed, the simulated refuge serves as attractant), the sugar in the DTSB on a DATBS functions to trigger an ingestion response in any mosquito that lands on a darkened portion of the DATBS so that the mosquito will ingest the poison in the DTSB. This allows the use of cheap sucrose rather than special fructose mixtures containing plant nectars or scents. And because the DATBS uses a dried sweet poison solution rather than the liquid or gel ones used in many prior art devices, the poison-sugar solution can be applied during manufacture, rather than at the point of deployment as is the case with many prior art traps. This enables the sale of ready-to-deploy traps.

None of the prior art traps combines a simulated refuge to attract adult mosquitoes with a lethally ingested agent to kill them. The MosquiTRAP uses a sticky surface to entrap the mosquito which eventually dies and the BG-Sentinel trap uses a vacuum to pull the mosquito into a chamber where it would eventually die. The ovillanta does not kill or even trap adult mosquitoes. Several traps simply capture and contain the mosquitoes. On the other hand, a DATBS utilizes a dried mixture of poison and sugar to kill mosquitoes.

Unlike DATBS, all prior art traps are three-dimensional in order to incorporate entrance channels and capture chambers, and consequently must be made out of relatively rigid materials that must be formed and/or assembled. As a result, they are relatively costly to make, both due to the type and amount of material required and the cost of forming and/or assembling the trap (tooling may also be required, further increasing costs and necessitating capital). Some traps also incorporate active elements, such as a fan or carbon dioxide dispenser, further increasing their cost. In addition, shipping these traps to stores is relatively costly due to their volume and in stores they consume a great deal of valuable shelf space. DATBS, on the other hand, can made using very inexpensive materials, such as a piece of dyed/pigmented paper or plastic, dye, sugar and boric acid in a simple manufacturing process that requires little or no tooling or assembly. As a result, the cost to manufacture a DATBS is extremely low, which means DATBS can made available commercially at a very low price. And being flat, they require almost no store shelf space. Since many of the areas where $Ae.$ $aegypti$ is problematic are also low-income areas, a very low cost mosquito control device highly desirable.

Prior art traps are also relatively large, and are intended and appropriate primarily for deployment outside of buildings such as residential dwellings. The small size and low profile of the DATBS makes it ideal for use inside of dwellings. This is important because $Ae.$ $aegypti$, even if they breed outside, primarily feed within homes during the daytime or early evening. Even more importantly, $Ae.$ $aegypti$ often lay eggs on wet shower floors and in toilet tanks, breeding inside the residence, which renders outside traps completely ineffective.

Unlike prior art traps, which are three-dimensional stand-alone devices, a DATBS can be constructed by using almost any two dimensional material as a substrate, rigid (e.g., metal, ceramic), flexible (e.g., paper, vinyl, fabric), and everything in between. As a result, DATBS design is very flexible and unlike prior art traps with their fixed form, DATBS can be made in a wide variety of form factors and appearances. Moreover, DATBS can easily be integrated into or onto common household objects, such as a calendar, picture frame or refrigerator magnet.

An advantage of the DATBS over prior art traps is that once a DATBS is placed in a dwelling, mosquito control requires no other action. The DATBS operates without attention to attract and poison $Ae.$ $aegypti$. Another advantage is of the DATBS is that mosquitoes landing on the DATBS are not killed on the spot, but rather fly off after eating some of the DTSB and die elsewhere. Because $Ae.$ $aegypti$ attracted and poisoned by a DATBS fly off and die at a later time away from the DATBS, there is nothing left on the DATBS that might warn subsequent $Ae.$ $aegypti$ to avoid the trap. The $Ae.$ $aegypti$ does not know it has been poisoned until later. This is unlike traps which capture mosquitoes, either in chambers and bags or on a sticky surface. In those traps, the presence of captured and/or dying mosquitoes may deter subsequent mosquitoes from approaching the trap.

Example 1

In this example, the design of a simple ATSB device, which has the potential to be used as a tool for the reduction of indoor adult populations of *A. aegypti*, was tested. The efficiency of this device was measured under laboratory conditions to provide insight into the biological mode of action of the devices, and to evaluate parameters relevant for future field trials. Given the fact that devices according to the present invention will potentially be utilized inside households of vulnerable sectors of the population, it is important for the device to be safe for humans and affordable as well.

Methods

Mosquitoes

Two Ecuadorian strains of *Aedes aegypti* (Table 1), maintained at the Center for Infectious and Chronic Disease Research (CIEIC), were used in the experiments. Mosquitoes were reared and maintained under standard insectary conditions: 28±2° C. temperature; 80±10% relative humidity; 12 h:12 h (L:D) light cycle. Larvae were fed finely ground fish food. When required, mosquitoes were sexed during the pupal stage. Adults were kept in 15×15×15 cm cages. For maintenance, adult mosquitoes were fed 10% sucrose solution ad libitum. For blood feeding, female adult mosquitoes were offered access to a restrained female mouse. All mosquitoes were maintained under insectary conditions between 0 and 14 days after adult emergence before they were used for experiments. Mosquitoes referred to as "starved" were deprived of access to sugar during 48 hours previous to their use in experiments (but allowed continuous access to water throughout this time).

TABLE 1

Strains of *Aedes aegypti* used in this study

| Strain | Country | Province | City | Parish | Acquisition Year [a] |
|---|---|---|---|---|---|
| Ae. aeg-2 | Ecuador | Guayas | Guayaquil | Fébres Cordero | 2014 |
| TCOCA 02.1 | Ecuador | Orellana | Puerto Francisco de Orellana | Francisco de Orellana | 2015 |

[a] Indicates year of addition of these strains to the CIEIC.

Attractive Sugar Bait Devices

The exemplary devices consisted of two concentric foam sheet circles: an inner white circle (5 cm diameter) and an outer black circle (10 cm diameter). Before assembly, both foam circles were individually submerged for 24 hours in either a non-toxic sugar solution (10% sucrose, prepared using distilled water and brown sugar) or a toxic sugar solution (1% boric acid, prepared using 10% sucrose solution as solvent). Henceforth in this section, devices coated with non-toxic sugar solution will be called "attractive sugar baits" (ASBs) in order to differentiate them from ATSBs, which are coated with the toxic sugar solution.

Figure 1A:
FIGS. 1A-1E are schematics of various prior art mosquito traps or control devices.
Figure 1B:
Figure 1C:
Figure 1D:
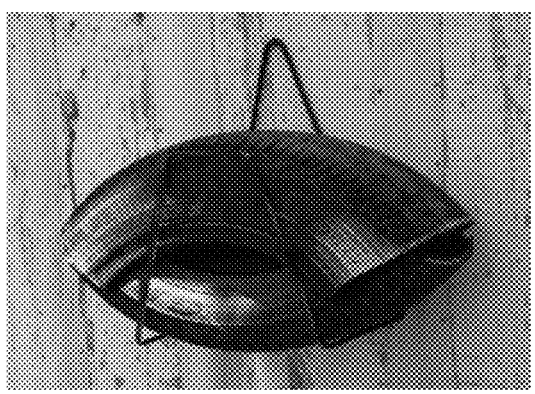
Figure 1E:
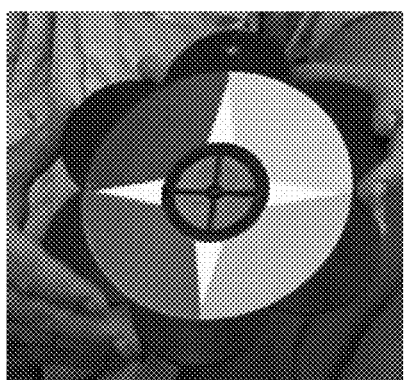

After 24 hour submersion, the foam circles were air-dried for 24 hours and subsequently stapled together. A bamboo stick was fixed to the back of the device, to serve as a stand (FIG. 1B).

Survival Assessment of Mosquitoes Exposed to the Device

To determine whether exposure to the ATSB devices has an influence on adult mosquito survival probability, an experiment was conducted in which groups of 30 adult female mosquitoes, placed in a 15×15×15 cm cage, were exposed during 48 hours to either an ATSB device (for experimental treatments) or an ASB device (for control treatments). Mortality in each cage was recorded every 24 hours. The test was replicated four times. The assessment was repeated using each of the two strains.

For each treatment, interval censored survival data and subsequent non-parametric maximum likelihood estimate (NPMLE) was plotted and analyzed using the 'survival' package in R. A log-rank hypothesis test was used to compare the survival distributions of the two treatments.

Appraisal of the Biological Mode of Action of the Devices

Figures 3A, 3B, 3C, 3D:
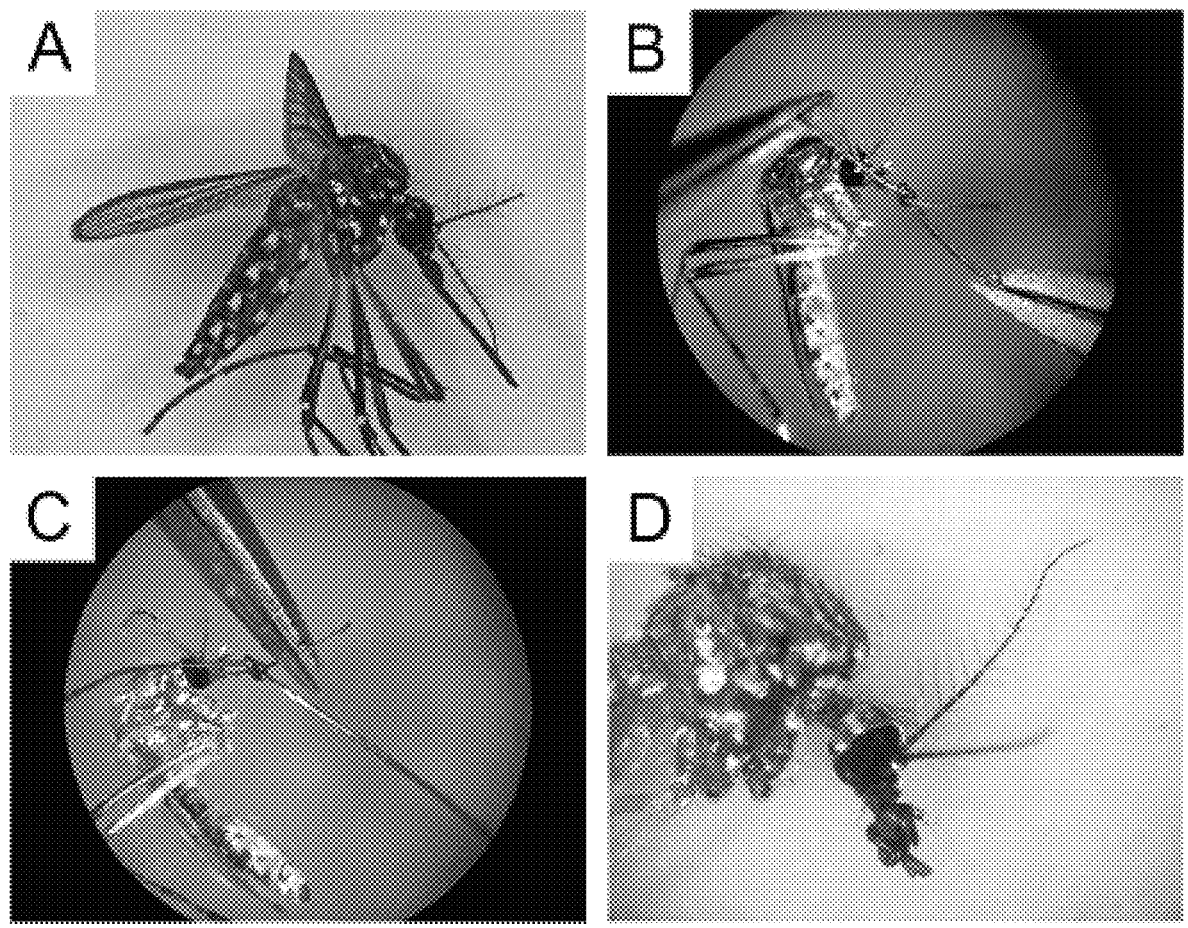
FIGS. 3A-3D are images of the feeding disruption procedure according to the present invention, where: (A) is anesthetized individual with whole proboscis; (B) is human hair tied at the proximal end of the proboscis; (C) is micro-dissection scissor removal of proboscis' segment anterior to the knot; and (D) is feeding of the disrupted individual.

Uptake Mechanism of the Toxic Component. To establish whether the toxic component of ATSBs needs to be ingested by the mosquitoes in order to exert its effect, the devices were presented to cohorts of adult females which were unable to ingest food due to the surgical ablation of their mouthparts. To establish these cohorts, individuals were first anesthetized by placing them at 4° C. during 10-15 minutes. Anesthetized specimens were individually placed under a dissection microscope and, using a human hair, a knot was tied in the proboscis' proximal end in order to create a constriction that would impede the flow of food. Subsequently, the part of the proboscis anterior to the knot was removed using micro-dissection scissor (FIG. 3). Following intervention, mosquitoes were left to rest for 24 hours before being use in any experiment.

To control for the potentially negative effect of the anesthetizing procedure in mosquito survival, non-ablated mosquitoes used in control groups were also placed at 4° C. during 10-15 minutes, and allowed to recover during 24 hours before experimental set-up.

For each experiment two cages were set up, each containing 20 starved ablated mosquitoes. Individuals in one of these cages were exposed to an ATSB device, and individuals in the other cage were exposed to an ASB device. Two more cages containing 20 non-ablated, starved mosquitoes each were set up likewise, making a total of four cages (a summary of the experimental set-up is shown in Table 2). Mortality in all groups was assessed at 24 and 48 hours of exposure to the devices. The experiment was replicated three times. Only one strain (Ae.aeg-2) was tested. Normal distribution of the data was determined with Kolmogorov-Smirnov and Shapiro-Wilk tests. Analysis of variance (ANOVA) was performed to evaluate differences between treatments and a post-hoc Tukey's test was used to determine ranks.

TABLE 2

Treatments used to evaluate the mechanism of ingression of the toxic component.

|  | Whole proboscis | Cut proboscis |
|---|---|---|
| Toxic Device | Whole toxic | Cut toxic |
| Non-toxic device | Whole non-toxic | Cut non-toxic |

Histopathological Effects on the Midgut. Two cages were erected, each containing 30 adult starved female mosquitoes. Specimens in one of these cages were exposed to a toxic device (ATSB), and specimens in the other cage were exposed to a non-toxic device (ASB). Cages were monitored during the next 24 hours, and dead mosquitoes were removed by aspiration every hour from the cages. Using a dissection microscope, the legs, head and wings of every dead specimen were removed on a drop of 70% ethanol. The abdominal cuticle was gently disrupted in order to permit the exposure of internal tissues to the fixative. Afterwards, individuals were fixed in a solution containing 2.5% glutaraldehyde, 2.5% paraformaldehyde in 0.1M cacodylate buffer (pH 7.4), and stored at 4° C. for 72 hours. Specimens were then washed in cacodylate buffer with 0.1M sucrose overnight. Post-fixing was achieved by leaving the specimens for two hours at 4° C. in 2% osmium tetroxide in 0.1 cacodylate buffer, pH 7.4. Subsequently, individuals were stained using 2% uranyl acetate and left to rest for three hours in the dark at room temperature. Tissues were later dehydrated through a series of ethanol baths (50%, 70%, 95%, 100%). Afterwards, they were placed in propylene oxide for 30 minutes, then in a 1:1 volume propylene oxide:resin (Epon 812, Araldite 502, dodecenyl succinic anhydride, benzyl dimethylamine) mixture for one hour, and later, 1 more volume of resin was added and left on a rotator overnight. Finally, mosquitoes were embedded in resin and incubated at 60° C. for 24 hours. Resin embedded tissues were cut using an ultramicrotome and mounted on copper grids. Later, mosquitoes were stained using 2% uranyl acetate. Specimens were observed using a transmission electron microscope and micrographs of interesting tissues were obtained.

Evaluation of Parameters Relevant for Future Field Trials

Effects of the Physiological Status of the Mosquitoes on the Performance of the Device. These tests were performed using strain TCOCA 02.1. Two different physiological statuses were evaluated using mated starved female adult mosquitoes: blood fed and parous. Females deemed as "blood fed" were established by selecting blood-engorged individuals immediately after a blood meal. Females deemed as "parous" were first blood fed and subsequently maintained for 7 days under insectary conditions, in order to ensure that they had oviposited before being used for experimentation.

Two cages for each of the defined physiological statuses were set up with 30 mosquitoes each. One cage exposing them to an ATSB and the other to an ASB. Survival data was gathered at 24 and 48 hours. The test was replicated 3 times. Interval censored survival data was plotted and analyzed using the 'survival' package in R. A log-rank hypothesis test was used to compare the survival distributions of the two treatments.

Shelf Life of the Device. In order to determine the shelf life of ATSB devices, toxicity tests were performed using ATSB and ASB devices which had been stored for 38, 80 and 118 days after their production. For storage, devices were individually wrapped inside a sealed plastic bag and placed inside an incubator at 28±2° C. and 80±10% relative humidity.

The protocol for performing the bioassays was identical to that previously described to assess survival of mosquitoes exposed to the device. For each group of mosquitoes exposed to an ATSB device, a matching control group was exposed to an ASB device stored during an equivalent amount of time.

For each storage time, three replicates of the experiment were set up. Interval censored survival data was plotted and analyzed using the 'survival' package in R. A log-rank hypothesis test was used to compare the survival distributions of the two treatments.

Results

Survival Assessment of Mosquitoes Exposed to the Device

Figure 4:
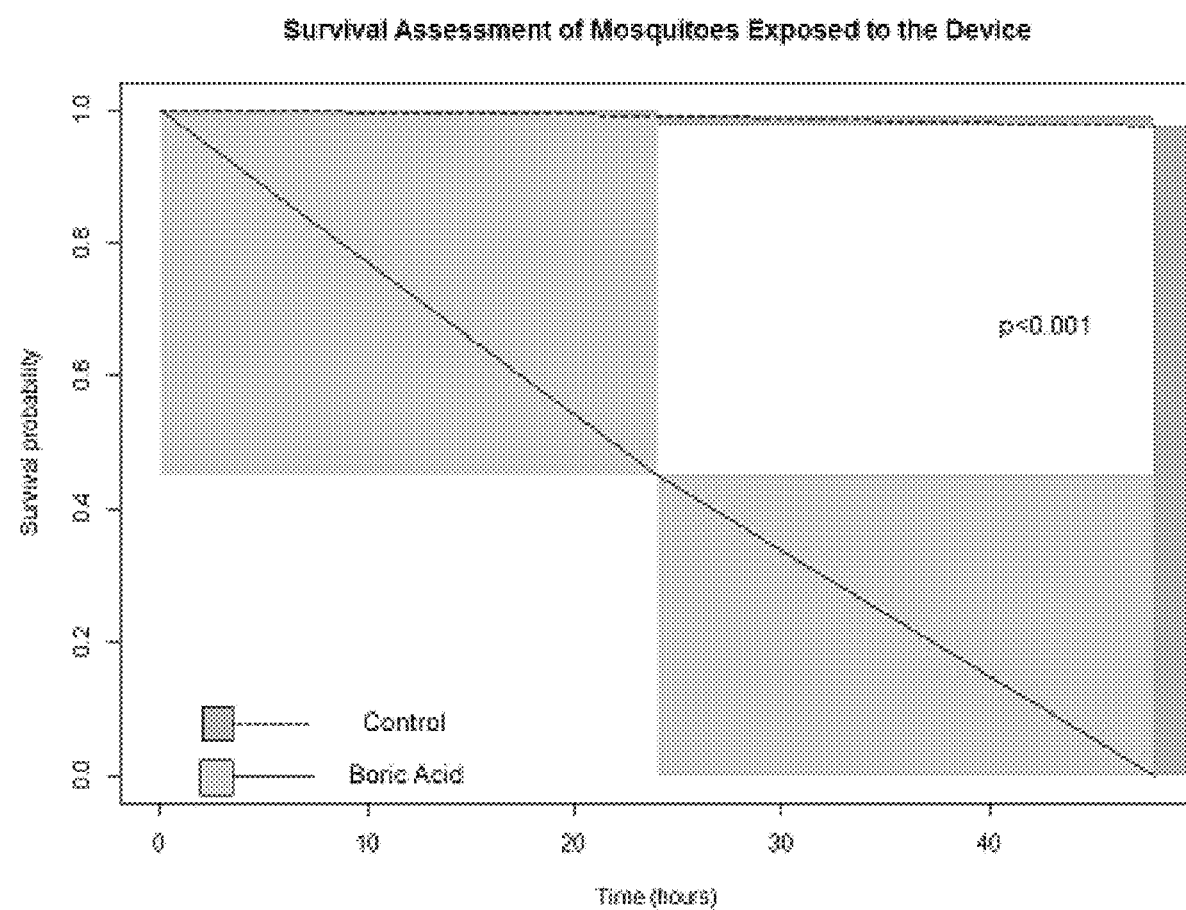
FIG. 4 is a graph of the survival assessment of mosquitoes exposed to the device, where survival and NPMLE of individuals exposed to toxic (dotted line; n=120) or non-toxic devices (solid line; n=120) and tnterval-censored survival data collected at two time points (24 h and 48 h).

Mosquitoes exposed to toxic devices presented 55% survival probability reduction in the first 24 hours post-exposure, and 45% reduction between 24 and 48 hours post-exposure, resulting in a 0% survival probability by the end of the trials. On the other hand, mosquitoes exposed to control devices presented 0.83% survival probability drop during the first interval (0 h-24 h) and 1.67% reduction during the second interval (24 h-48 h), resulting in 97.5% survival probability by the end of the experiment (FIG. 4). Differences between the survival curves of toxic and non-toxic treatments were highly significant ($p<0.001$).

Appraisal of the Biological Mode of Action of the Devices

Figure 5:
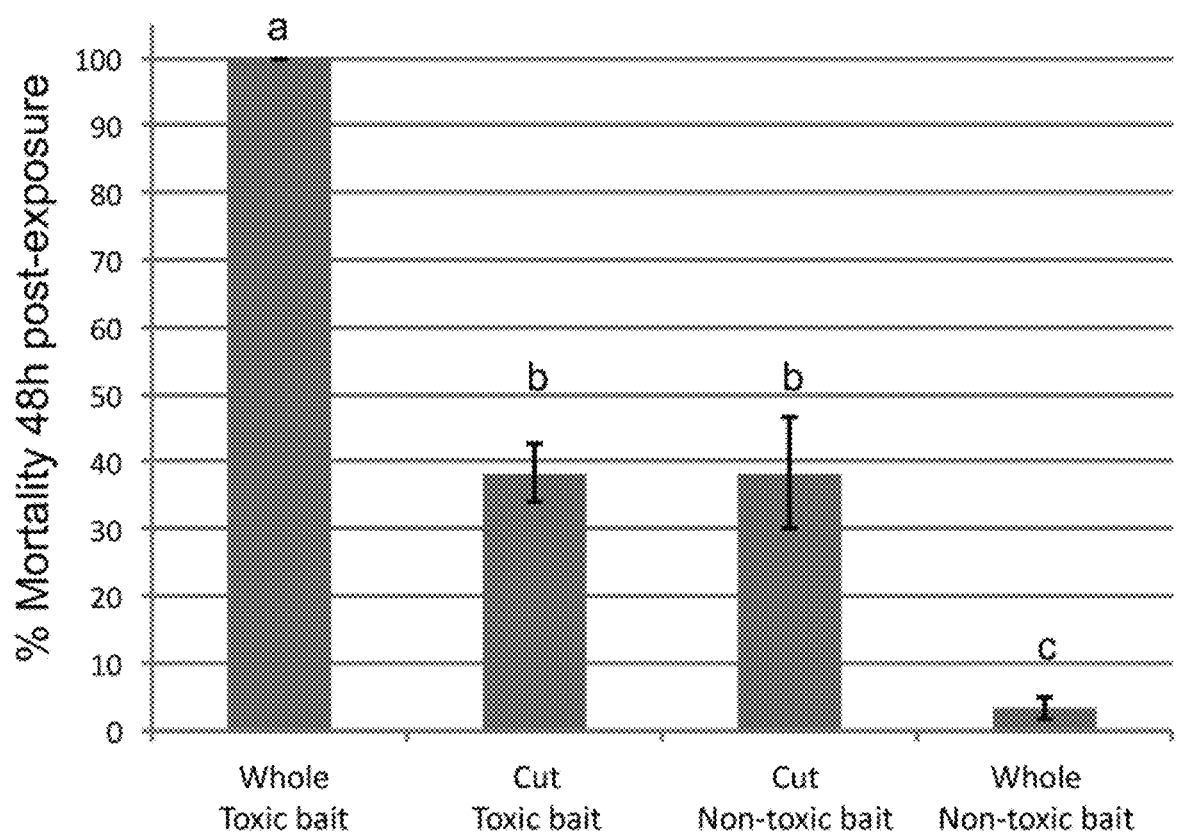
FIG. 5 is a graph of the uptake mechanism of the toxic component, where mortality after 48 hours of exposure to devices and mosquito conditions is summarized in Table 2 and the letters above the bars show ranks of statistical significance with different letters mean a $p<0.05$.

Uptake Mechanism of the Toxic Component. After 48 hours, mosquitoes which could still feed (i.e. mosquitoes with an intact proboscis), presented 100% mortality when exposed to the toxic device, and 3.33% mortality when exposed to the non-toxic device. Mosquitoes which were intervened in order to block feeding presented 38.33% mortality regardless of the toxic or non-toxic condition of the devices. Significant differences were found between the four treatments ($p<0.001$). Post-hoc pairwise comparison determined only intervened treatments were not significantly different between each other (FIG. 5).

Figures 6A, 6B, 6C, 6D, 6E, 6F:
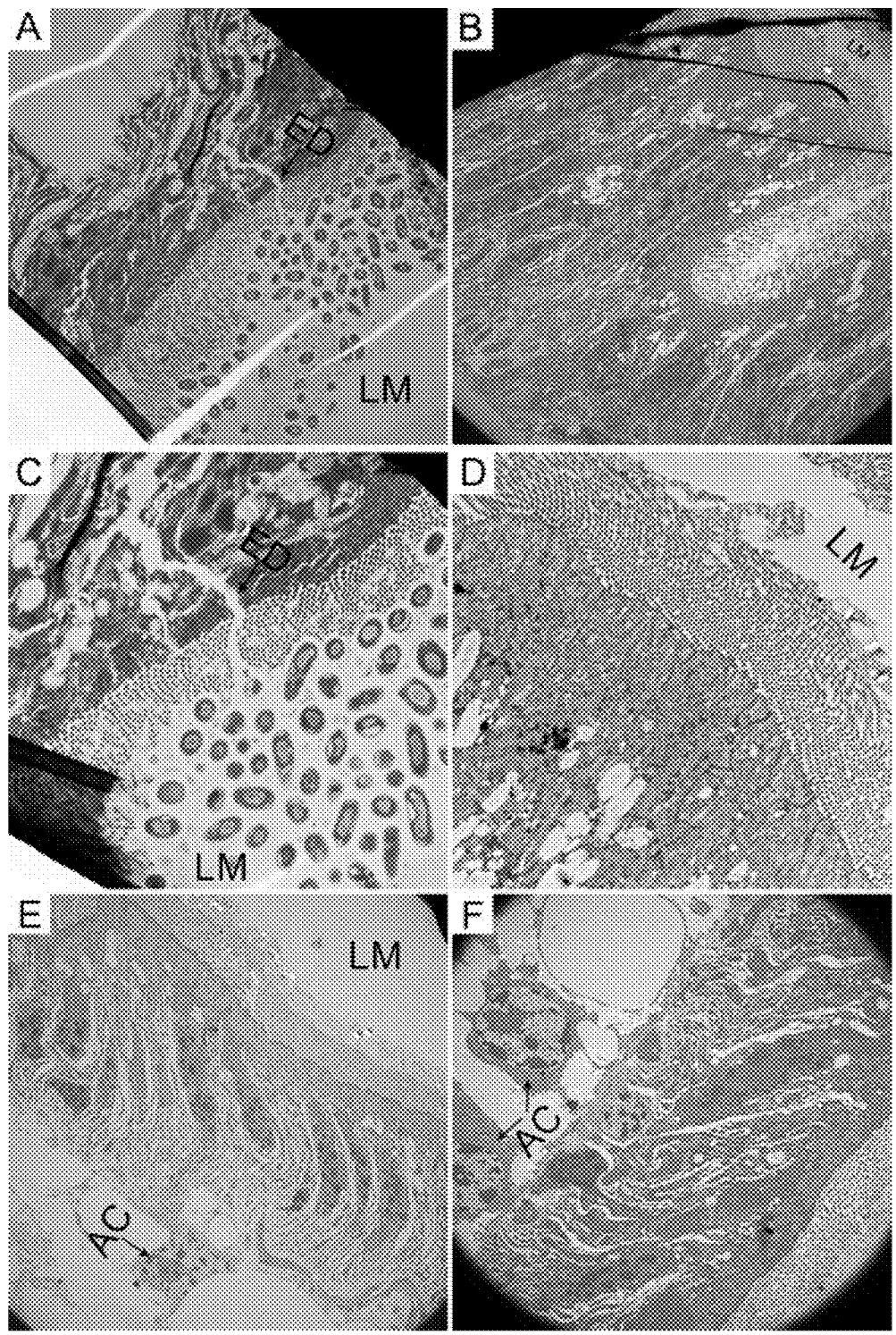

Histopathological Effects on the Midgut. Mosquitoes that had ingested toxic sugar solution presented histological abnormalities in the posterior midgut. Electron micrographs depict a disruption of the continuity of the epithelial tissue (FIGS. 6A, 6C). Due to the distribution of bacteria in the gut lumen, this disruption cannot be considered a microscopy artifact. In addition, abnormal adipocytes were found and are believed to be undergoing a process of necrosis (FIGS. 6E, 6F). These two affections are the probable cause of death of these individuals. Microscopic images of individuals that were only exposed to sucrose solution presented none of these pathologies on the posterior midgut (FIGS. 6B, 6D).

Evaluation of Parameters Relevant for Future Field Trials

Effects of the Physiological Status of the Mosquitoes on the Performance of the Device. Both physiological statuses evaluated (blood fed and parous) presented a lower survival probability when exposed to toxic devices than when exposed to non-toxic devices.

Blood fed females' survival probability dropped 13.33% during the (0 h-24 h) interval, 22.22% during the (24 h-48 h) interval, and 55.56% during the last interval (48 h-72 h). This results in 8.89% survival probability by the end of the experiment after 72 hours of exposure. On the other hand, the non-toxic control for this physiological status resulted in 90% survival probability by the end of the 72 hours after having dropped 8.89%, 1.1%, and 0% during the (0 h-24 h), (24 h-48 h), and (48 h-72 h) intervals, respectively (FIG. 7A). Differences between control and toxic treatment survival curves are highly significant ($p<0.001$).

Parous females presented 65.6% decline on their survival probability during the first interval (0 h-24 h) and 0% survival probability after 48 hours of being exposed to toxic devices. These results are significantly different ($p<0.001$) to the non-toxic control, which showed 2.2% survival probability drop during the (0 h-24 h) interval, resulting in 97.8% survival probability after 48 hours of exposure had passed.

Shelf Life of the Device. Mosquitoes exposed to toxic devices stored for 38 days showed 0% survival probability after the (0 h-24 h) interval. On the contrary, non-toxic treatment showed 96% survival probability after the (24 h-48 h) interval was concluded. Highly significant differences were found between treatments (FIG. 8A).

Mosquitoes exposed to toxic devices stored for 80 days showed 16% survival probability after the (0 h-24 h) interval, and 0% survival probability at the end of the experiment. On the other hand, non-toxic treatment showed 97% survival probability after the (24 h-48 h) interval was concluded. Highly significant differences were found between treatments (FIG. 8B).

Mosquitoes exposed to toxic devices stored for 118 days showed 95% survival probability after the (0 h-24 h) interval, 64% survival probability during the (24 h-48 h) interval, and 35% survival probability by the end of the trials. On the contrary, non-toxic treatment showed 96% survival probability after the (24 h-48 h) interval was concluded. Highly significant differences were found between treatments (FIG. 8C).

Example 2

Randomized Controlled Trial Funded by Syracuse University

In this study, a small field evaluation of a simple ATSB device, which has the potential to be used as a tool for the reduction of indoor adult populations of Ae. Aegypti, was tested in Machala, Ecuador using a household randomized controlled trial.

Methods

Forty houses in Machala, Ecuador were recruited to participate in a randomized trial of deployed ATSB devices (FIG. 2B). These houses were randomized into A or B groups, and an ABBA design was used to test the effectiveness of deploying a single device in each home. For the first four weeks the A group received the intervention and the B group served as control. The following four weeks the B group received the intervention and the A group served as the control.

Each week, study team members armed with the prokopack mosquito aspirator visited the study households and collected live mosquitos inside and outside the home. These teams also conducted a household survey to measure levels of mosquito prevention behavior in the household as well as the perception of presence of bees, butterflies or other arthropods in the household during the previous week. Collected mosquitos were transported to the entomology laboratory of the National Vector Control Service of the Ministry of Health. Study team members counted and identified mosquitoes as male/female Aedes aegypti or other species using standard taxonomic keys used by technicians at the vector control service. Trained technicians also determined whether the Ae. aegypti had taken a bloodmeal and if so what stage of digestion was that particular bloodmeal.

Results

In intervention households Ae. aegypti were less likely to have taken a bloodmeal compared to control households. Killing older females effectively decreases disease transmission, and these results warrant further investigation.

TABLE 2

Proportions of female Aedes aegypti that had a late stage blood meal (older) versus not taken blood or had an early stage blood meal (younger) caught in control and intervention. Chi-squared statistic with standard errors adjusted for correlated data = 4.50, p = 0.0403. Younger mosquitos are less likely to carry pathogens than older mosquitos, and so killing older mosquitos controls disease transmission.

| Age of female Aedes aegypti | Numbers caught in control household (percentage of numbers caught) | Numbers caught in intervention household (percentage of numbers caught) | Total |
|---|---|---|---|
| No blood or early stage blood meal (younger) | 334 (77.0%) | 100 (23.0%) | 434 (100%) |
| Late stage blood meal (older) | 681 (83.2%) | 138 (16.9%) | 819 (100%) |

It should be recognized by those of skill in the art that the present invention may be effective against other species of mosquitos and other insects in general, such as fruit flies, house flies, etc. and efficacy may be determined using the protocols set forth in the examples provided herein.

What is claimed is:

1. A lure and kill device, comprising:
    a planar substrate having a first region that is surrounded at least in part by a second region to form an apparent refuge, wherein one of the first region and the second region has a first Munsell neutral value that is darker than a second Munsell neutral value of the other of the first region and the second region; and
    a coating positioned on at least one of the first region and the second region, wherein the coating consists of a mixture of an amount of an ingested insecticide and a bait.

2. The device of claim 1, wherein the bait comprises sucrose.

3. The device of claim 2, where the ingested insecticide comprises boric acid.

4. The device of claim 3, wherein the coating has a ratio of boric acid to sucrose equivalent to one percent boric acid dissolved in a ten percent solution of sucrose and water and then dried.

5. The device of claim 1, wherein the second region completely surrounds the first region.

6. The device of claim 5, wherein the second region has the first Munsell neutral value.

7. The device of claim 5, wherein the first region has the first Munsell neutral value.

8. The device of claim 5, wherein the first region is a circle.

9. The device of claim 8, wherein the second region is a ring.

10. A method of luring and killing mosquitos, comprising the step of providing a lure and kill device having a planar substrate having a first region that is surrounded at least in part by a second region to form an apparent refuge, wherein one of the first region and the second region has a first Munsell neutral value that is darker than a second Munsell neutral value of the other of the first region and the second region, and a coating positioned on at least one of the first region and the second region, wherein the coating consists of a mixture of an amount of an ingested insecticide and a bait.

11. The method of claim 10, wherein the bait comprises sucrose.

12. The method of claim 11, where the ingested insecticide comprises boric acid.

13. The method of claim 12, wherein the coating has a ratio of boric acid to sucrose equivalent to one percent boric acid dissolved in a ten percent solution of sucrose and water and then dried.

14. The method of claim 10, wherein the second region completely surrounds the first region.

15. The method of claim 14, wherein the second region has the first Munsell neutral value.

16. The method of claim 14, wherein the first region has the first Munsell neutral value.

17. The method of claim 14, wherein the first region is a circle.

18. The method of claim 15, wherein the second region is a ring.

\* \* \* \* \*